(No Model.) 2 Sheets—Sheet 2.

W. S. RICHARDS.
SYSTEM OF ELECTRICAL PROPULSION FOR VEHICLES.

No. 458,377. Patented Aug. 25, 1891.

WITNESSES
Irving H. Fay.
H. Dwyer.

INVENTOR
Walter S. Richards,
By C. A. Shawtleo,
ATT'Y's

THE NORRIS PETERS CO., PHOTO-LITHO., WASHINGTON, D. C.

UNITED STATES PATENT OFFICE.

WALTER S. RICHARDS, OF NATICK, ASSIGNOR OF ONE-HALF TO GEORGE B. JAMES, OF BOSTON, MASSACHUSETTS.

SYSTEM OF ELECTRICAL PROPULSION FOR VEHICLES.

SPECIFICATION forming part of Letters Patent No. 458,377, dated August 25, 1891.

Application filed January 19, 1891. Serial No. 378,279. (No model.)

*To all whom it may concern:*

Be it known that I, WALTER S. RICHARDS, of Natick, in the county of Middlesex, State of Massachusetts, have invented certain new and useful Improvements in Systems of Electrical Propulsion for Vehicles, of which the following is a description sufficiently full, clear, and exact to enable any person skilled in the art or science to which said invention appertains to make and use the same, reference being had to the accompanying drawings, forming part of this specification, in which—

Figure 1:
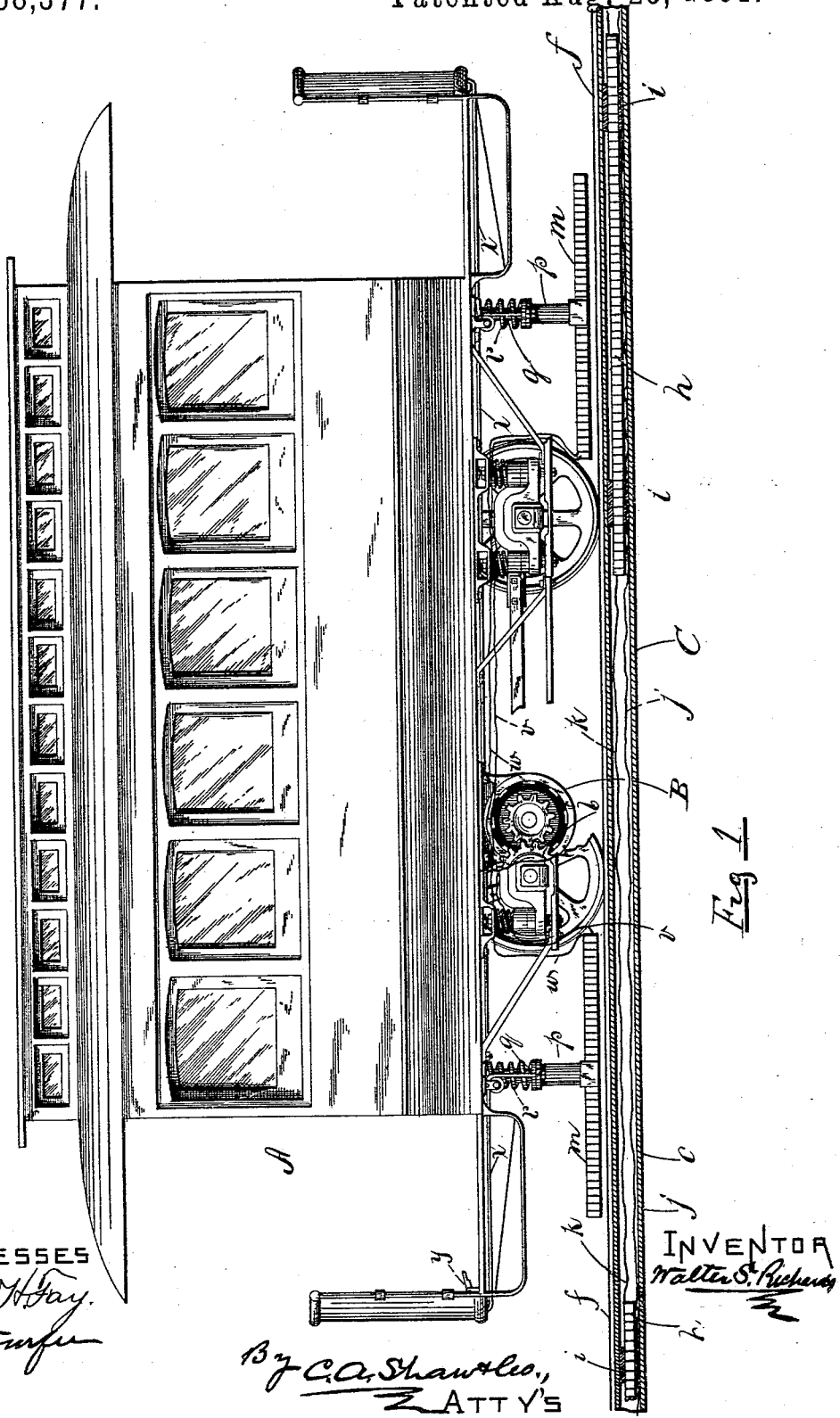
Figures 2, 3:
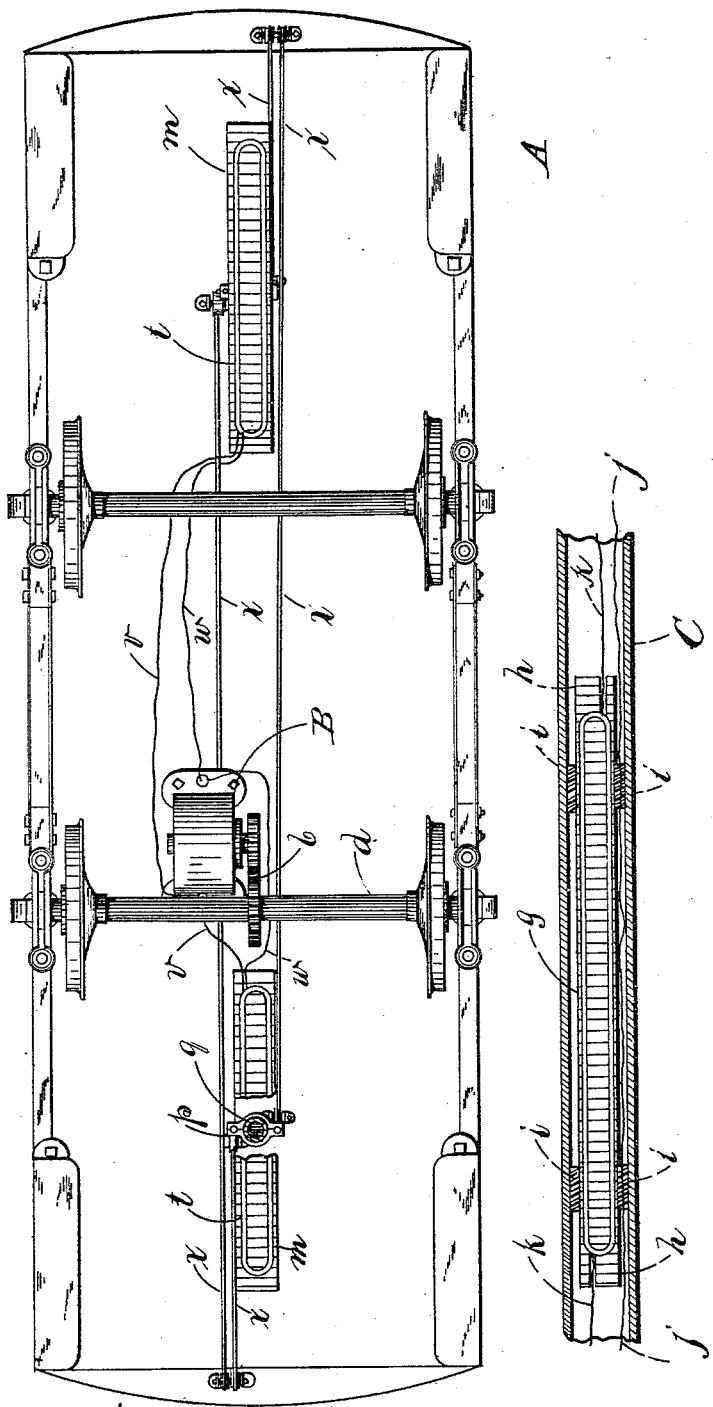

Figure 1 is an elevation, partly in section, showing my improved system applied to a street-car; Fig. 2, a bottom plan view of the car, and Fig. 3 a sectional view of a portion of the conduit.

Like letters of reference indicate corresponding parts in the different figures of the drawings.

My invention relates especially to a system of electrical propulsion wherein the motor is driven by an induced current, and is designed particularly to avoid the necessity for employing the overhead conducting-wires or open conduits ordinarily used in electric street-car systems.

By my improvement any direct electrical connection between the vehicle and ground is also avoided, and in carrying out the same I make use of means which will be understood by all conversant with such matters from the following explanation.

In the drawings, A represents a street-car, which may be of any suitable form and construction. An alternating motor B is disposed on the car in any suitable position and has its shaft geared at $b$ to an axle $d$. An air and water tight pipe or conduit C, of suitable diameter, is disposed centrally between the track-rails $f$ flush with the surface of the road-bed, its upper face being flattened and roughened or corrugated, if desired, to prevent slipping thereon.

Primary coils $g$ of an electrical transformer are mounted within the conduit, said coils being arranged at suitable distances apart, preferably slightly less than the length of the car. Each coil $g$ is disposed in a laminar iron block $h$, which is supported out of contact with the pipe C by insulating bushings $i$ or other suitable means. An insulated conducting-wire $j$ is disposed in the pipe out of contact with the blocks $h$, and a wire $k$ connects succeeding coils $g$ of the series. Said wires run from an alternating-current dynamo or other generator at a power-station, from which the coils are continuously charged.

A horizontally-arranged laminar iron block $m$ is pendent from each end of the car by means of a cylinder or tube $p$, fitted to slide vertically on a spindle $q$ on said car. Coiled springs $r$ on the spindles tend to force said blocks downward. The secondary coils $t$ of the transformer are wound within said blocks and are connected by wires $v$ $w$ with the motor B. Cords or chains $x$, secured to the cylinders $p$, pass over suitably-arranged pulleys on the car and lead to foot-treadles $y$ on the platforms, by depressing which the blocks $m$ may be elevated against the pressure of the springs $r$. The car being in the position shown in Fig. 1, one block $m$ thereon is in the field of a primary coil $g$ in the conduit. An alternating current is induced therefrom and transmitted to the motor B, actuating said motor and driving the car. The secondary coils are arranged at such distance apart on the car that, as the car advances, when one of said coils leaves the field of a primary coil the secondary coil at the opposite end of the car enters the field of a succeeding primary coil in the pipe C. A constant alternating current is thus supplied to the motor. By depressing the treadle $y$ the secondary coils may be elevated out of the field of the primaries for the purpose of cutting off the induced current from the motors, or the ordinary switches employed for this purpose may be used. By interposing a suitable commutation device in the conducting-wires of the secondary coils a direct-current motor may be utilized for driving the car.

I do not confine myself to the specific arrangement of parts described, as they may be disposed in any manner suitable to effect the result stated. Nor do I confine myself to encasing the primary coils, as when the device is employed for propelling bodies other than cars or when said primaries are not exposed to moisture or liable to accidental contact with the ground they may remain exposed and effect the same result.

Having thus explained my invention, what I claim is—

1. The combination of a way or road, primary electric coils disposed in series along said way and connected with a dynamo or other source of electricity, a vehicle adapted to travel on said way, propelling mechanism on said vehicle, an electric motor on said vehicle for operating the propelling mechanism, and secondary coils on said vehicle connected with said motor and adapted to be inductively electrified by said primary coils.

2. The combination of a way or road, primary electric coils disposed in series along said way and connected with a dynamo or other source of electricity, a protective casing inclosing said coils, a vehicle adapted to travel on said way, propelling mechanism on said vehicle, an electric motor on said vehicle for operating the propelling mechanism, and secondary coils on said vehicle connected with said motor and adapted to be inductively electrified by said primary coils.

3. The combination of a railroad-track, primary electric coils disposed in series in the bed of said track and connected with a dynamo or other source of electricity, a car on said track, propelling mechanism for said car, an electric motor on said car for operating the propelling mechanism, and secondary coils on said car connected with said motor and adapted to be inductively electrified by said primary coils.

4. The combination of a railroad-track, primary electric coils disposed in series in the bed of said track and connected with a dynamo or other source of electricity, a protective casing inclosing said coils, a car on said track, propelling mechanism for said car, an electric motor on said car for operating the propelling mechanism, and secondary coils on said car connected with said motor and adapted to be inductively electrified by said primary coils.

5. The combination of a way or road, primary electric coils disposed along said way and connected with a dynamo or other source of electricity, a vehicle adapted to travel on said way, propelling mechanism on said vehicle, an electric motor on said vehicle for operating the propelling mechanism, secondary coils on said vehicle connected with said motor and adapted to be inductively electrified by said primary coils, and an adjustable support for said secondary coils, whereby they may be elevated out of the field of the primary coils.

6. The combination of a way or road, primary electric coils disposed along said way and connected with a dynamo or other source of electricity, a protective casing inclosing said coils, a vehicle adapted to travel on said way, propelling mechanism on said vehicle, an electric motor on said vehicle for operating the propelling mechanism, secondary coils on said vehicle connected with said motor and adapted to be inductively electrified by said primary coils, and an adjustable support for said secondary coils, whereby they may be elevated out of the field of the primary coils.

7. A vehicle provided with a propelling mechanism, an electric motor for operating said mechanism, and secondary coils in connection with said motor for supplying the operating-current, said coils being adjustable and designed to be electrified by primary coils disposed in the path of the vehicle.

8. A vehicle provided with a propelling mechanism, an electric motor for operating said mechanism, an adjustable frame, and secondary coils disposed in said frame and in connection with said motor for supplying the operating-current, said coils being designed to be electrified by primary coils disposed in the path of the vehicle.

9. An electrically-propelled vehicle provided with an adjustable frame carrying secondary electric coils and lifting mechanism for said frame.

10. An electrically-propelled vehicle provided with an adjustable frame carrying secondary electric coils, lifting mechanism for said frame, and a treadle connected with said lifting mechanism for actuating it.

11. An electrically-propelled vehicle provided with adjustable frames suspended beneath the vehicle near each end thereof, said frames being provided with secondary electrical coils.

12. An electrically-propelled vehicle provided with a dependent spindle, a frame adapted to slide on said spindle and carrying secondary electric coils, a pulley, a treadle, and a lifting-cord connected to said frame and treadle and passing over said pulley.

WALTER S. RICHARDS.

Witnesses
O. M. SHAW,
K. DURFEE.